US010853264B2

(12) United States Patent
Suryanarayana et al.

(10) Patent No.: US 10,853,264 B2
(45) Date of Patent: Dec. 1, 2020

(54) VIRTUAL MEMORY SYSTEM (71) Applicant: Dell Products L.P., Round Rock, TX (US)

(72) Inventors: Shekar Babu Suryanarayana, Karnataka (IN); Sumanth Vidyadhara, Karnataka (IN); Parmeshwr Prasad, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 15/833,874

(22) Filed: Dec. 6, 2017

(65) Prior Publication Data

US 2019/0171580 A1  Jun. 6, 2019

(51) Int. Cl.
*G06F 12/1036* (2016.01)
*G06F 12/02* (2006.01)
*G06F 12/1009* (2016.01)

(52) U.S. Cl.
CPC ...... *G06F 12/1036* (2013.01); *G06F 12/0238* (2013.01); *G06F 12/1009* (2013.01); *G06F 2212/202* (2013.01); *G06F 2212/65* (2013.01)

(58) Field of Classification Search
None
See application file for complete search history.

(56) References Cited

U.S. PATENT DOCUMENTS

| 10,200,376 | B2* | 2/2019 | Cayton | H04L 63/101 |
| 2010/0268907 | A1* | 10/2010 | Ouren | G06F 12/0802 711/170 |
| 2012/0102490 | A1* | 4/2012 | Eide | G06F 9/45558 718/1 |
| 2012/0272036 | A1* | 10/2012 | Muralimanohar | G06F 12/0238 711/202 |
| 2012/0324251 | A1* | 12/2012 | Bolanowski | G06F 1/3203 713/300 |
| 2014/0089725 | A1* | 3/2014 | Ackaret | G06F 12/0653 714/6.1 |
| 2017/0371695 | A1* | 12/2017 | Sanjeepan | G06F 3/0619 |
| 2018/0063145 | A1* | 3/2018 | Cayton | H04L 63/101 |
| 2018/0189204 | A1* | 7/2018 | Sternberg | G06F 13/1673 |
| 2019/0042414 | A1* | 2/2019 | Juenemann | G06F 12/0804 |

\* cited by examiner

*Primary Examiner* — Charles Rones
*Assistant Examiner* — Ryan Dare
(74) *Attorney, Agent, or Firm* — Haynes and Boone, LLP (57) ABSTRACT A virtual memory system includes a virtual memory engine coupled to a plurality of physical memory devices and a virtual memory database. During an initialization process, virtual memory engine uses a first unique global identifier to create virtual memory in the virtual memory database by mapping a continuous virtual memory address range to non-continuous physical memory device address ranges that are provided across the plurality of physical memory devices. During the initialization process, or subsequently during runtime, the virtual memory engine uses a second global unique identifier to define a virtual memory device namespace in the virtual memory that includes a first continuous subset of the continuous virtual member address range. During runtime, the virtual memory engine then provides read and write block mode access to the plurality of physical memory devices via the virtual memory device namespace defined in the virtual memory database.

17 Claims, 8 Drawing Sheets

VIRTUAL MEMORY SYSTEM

BACKGROUND

The present disclosure relates generally to information handling systems, and more particularly to providing for consistent virtual memory block storage across physical memory devices in a virtual memory system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems utilize virtual memory, which is a memory management technique implemented in hardware and software that maps virtual memory addresses used by, for example, applications running on computing devices, to physical addresses on physical memory devices in the computing devices. The virtual memory storage may then be presented to the applications as a contiguous address space or a collection of continuous segments that allow for block mode access to that virtual memory storage by the applications. For example, virtual non-volatile dual inline memory modules (NVDIMMs) may be provided by exposing physical NVDIMMs to a virtual machine and/or operating system.

However, in such situations, any particular virtual NVDIMM risks having its memory namespace spread across multiple physical NVDIMMs addresses, and conventional virtual memory systems are unable to provide block mode access to virtual memory namespaces across such interleaved physical NVDIMMaddresses.

Accordingly, it would be desirable to provide an improved virtual memory system.

SUMMARY

According to one embodiment, an information handling system (IHS) includes a processing system; and a memory system that is coupled to the processing system and that includes instructions that, when executed by the processing system, cause the processing system to provide a virtual memory engine that is configured to: create, during an initialization process and in a virtual memory database using a first global unique identifier, virtual memory by mapping a continuous virtual memory address range to non-continuous physical memory device address ranges that are provided across a plurality of physical memory devices; define, in the virtual memory database using a second global unique identifier, a virtual memory device namespace in the virtual memory that includes a first continuous subset of the continuous virtual member address range; and provide, during runtime, read and write block mode access to the plurality of physical memory devices via the virtual memory device namespace defined in the virtual memory database.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
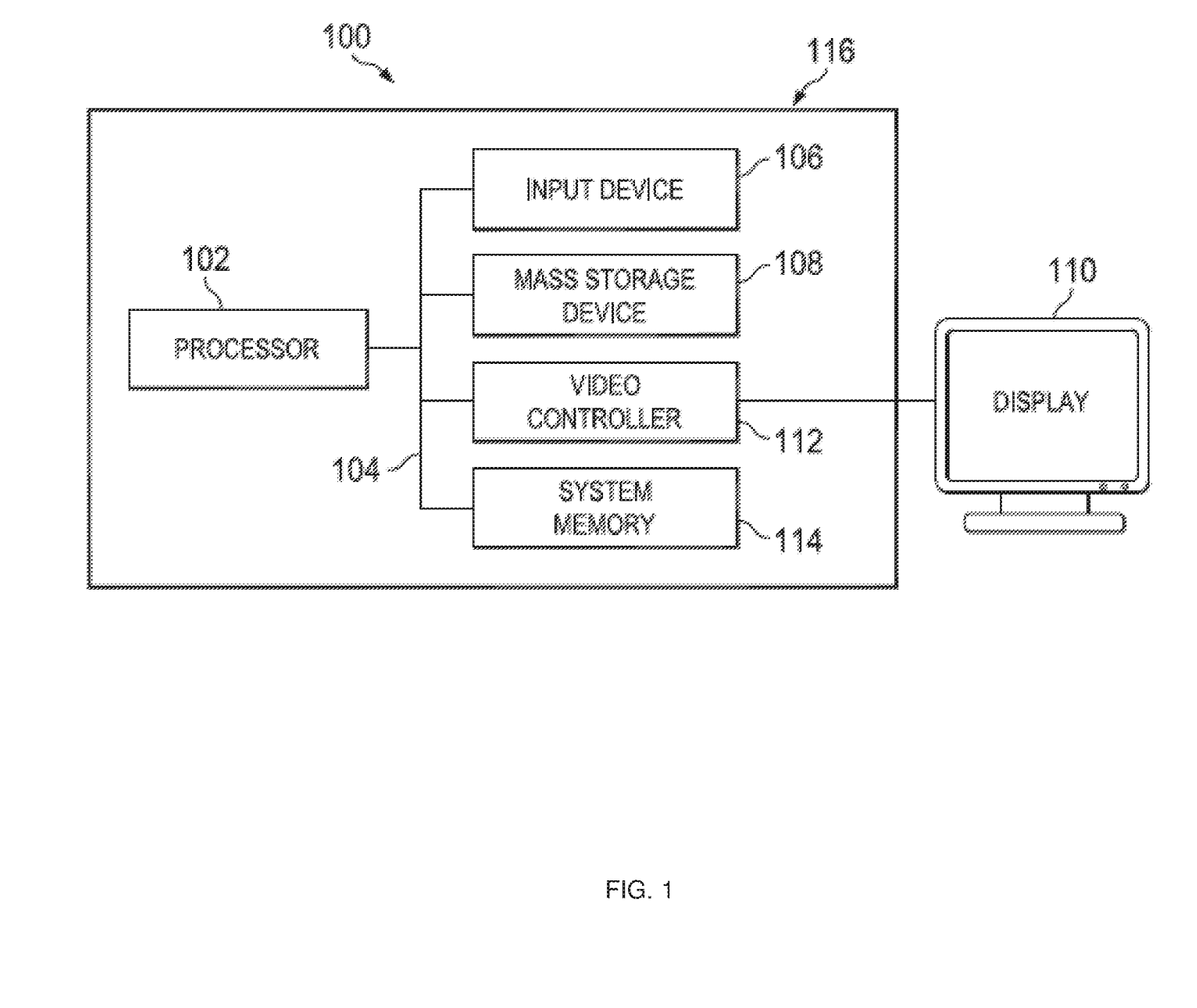
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
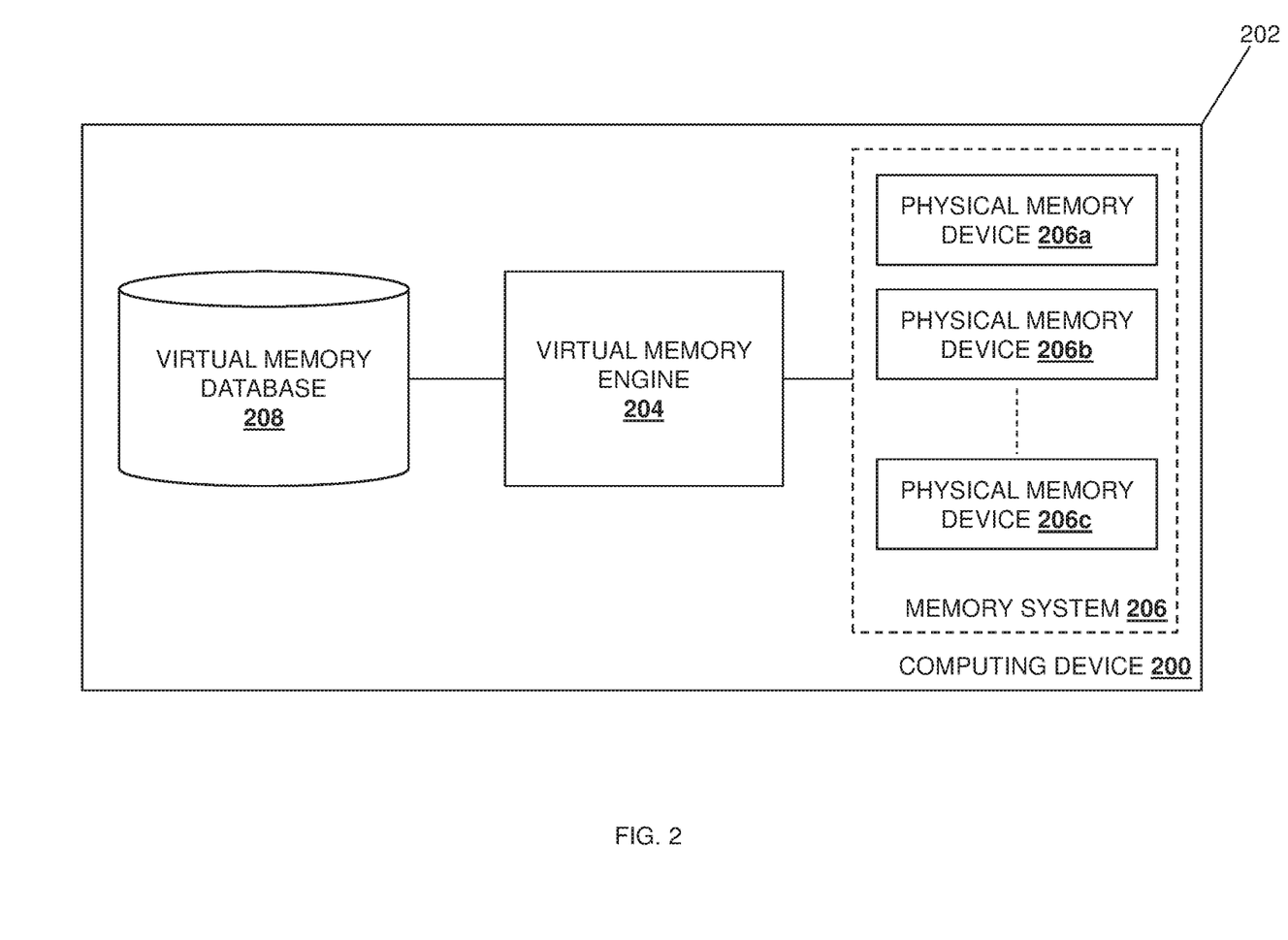
FIG. 2 is a schematic view illustrating an embodiment of a computing device.

Referring now to FIG. 2, an embodiment of a computing device 200 is illustrated. The computing device 200 may be provided by the IHS 100 discussed above with reference to FIG. 1, and/or may include some or all of the components of the IHS 100. In the embodiments discussed below, one of skill in the art in possession of the present disclosure will recognize that the computing device 200 is described as being provided by a server computing device. However, other computing devices (e.g., desktop computing devices, notebook/laptop computing devices, and/or other computing devices known in the art) will fall within the scope of the present disclosure as well. In the illustrated embodiment, the computing device 200 includes a chassis 202 that houses the components of the computing device, only some of which are illustrated in FIG. 2. For example, the chassis 202 may house a processing system (not illustrated, but which may include the processor 102 discussed above with reference to FIG. 1) that is coupled to a memory system (not illustrated, but which may include the memory 114 discussed above with reference to FIG. 1) that includes instruction that, when executed by the processing system, cause the processing system to provide a virtual memory engine 204 that is configured to perform the functions of the virtual memory engines and computing devices discussed below.

The chassis 202 may also house a memory system 206 that is coupled to the virtual memory engine 204 (e.g., via a coupling between the memory system 204 and the processing system) and that includes a plurality of physical memory devices 206a, 206b, and up to 206c. In the embodiments discussed below, the physical memory devices 206a-c are described as Non-Volatile Dual Inline Memory Modules (NVDIMMs), which one of skill in the art in possession of the present disclosure will recognize is a type of random access memory that is configured to retain data in the event of a power loss by copying data from volatile memory devices (i.e., the DIMMs) to a non-volatile memory (e.g., flash memory) using an on-board backup power supply (e.g., a battery or capacitor). However, one of skill in the art in possession of the present disclosure will also recognize that the virtual memory system of the present disclosure may utilize other types of physical memory devices while remaining within the scope of the present disclosure as well.

The chassis 202 may also house a storage system (not illustrated, but which may include the storage device 108 discussed above with reference to FIG. 1) that is coupled to the virtual memory engine 204 (e.g., via a coupling between the storage system and the processing system) and that includes a virtual memory database 208. In the embodiments discussed below, the virtual memory database 208 includes an Advanced Configuration and Power Interface (ACPI) table that may be populated with the NVDIMM Firmware Interface Table (NFIT) described below, although one of skill in the art in possession of the present disclosure will recognize that the virtual memory database 208 may include any other information to enable the functionality described below, and database structures other than an NFIT-populated ACPI table may fall within the scope of the present disclosure as well. While a specific computing device 200 has been described, one of skill in the art in possession of the present disclosure will recognize that computing devices may include other computing device components and/or different component configurations in order to provide conventional computing devices functionality, as well as the functionality discussed below, while remaining within the scope of the present disclosure.

Figure 3:
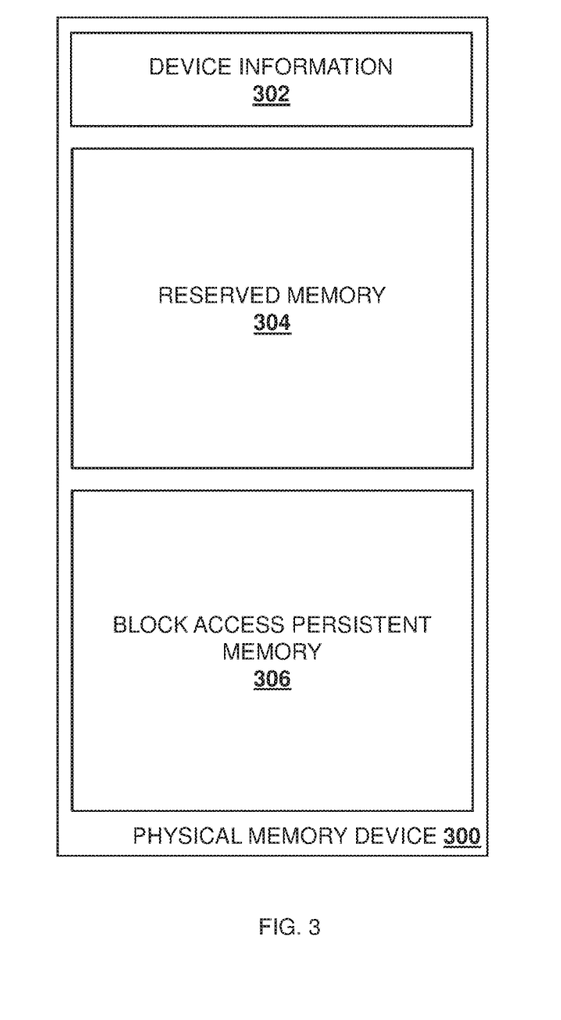
FIG. 3 is a schematic view illustrating an embodiment of a memory device used in the computing device of FIG. 2.

Referring now to FIG. 3, an embodiment of a physical memory device 300 is illustrated that may be any of the physical memory devices 206a-c discussed above with reference to FIG. 2. In the embodiments discussed below, the physical memory device 300 is an NVDIMM that provides volatile memory (i.e., the DIMMs) along with non-volatile memory, along with backup power that may be used to ensure that data stored on the volatile memory is copied to the non-volatile memory and is not lost in the event of a loss of power to the physical memory device 300. However, other physical memory devices will fall within the scope of the present disclosure as well. In the illustrated embodiment, the physical memory device 300 may be provided with device information 302 that may include a device path label, a per-device virtual memory namespace label, and/or other information about the data that is stored on the physical memory device 300. Furthermore, the physical memory device 300 may be provided with a reserved memory section 304, which may be configured by a user other system administrator to provide for fast booting operations (e.g., utilizing approximately 100 MB of space on the memory device 300), fast operating system deployment (e.g., utilizing approximately 400 MB of space on the memory device 300), fast data access (e.g., fast Tech Support Report (TSR) log access that utilizes approximately 800 MB of space on the memory device 300), and/or a variety of other reserved memory uses known in the art. Further still, as discussed below, block access persistent memory 306 may be defined in the physical memory device 300 for use in storing a variety of data that is allocated to the virtual memory as discussed below. While a specific physical memory device 300 has been described, one of skill in the art in possession of the present disclosure will recognize other types of memory devices may provide similar characteristics as the memory devices described herein, and thus will fall within the scope of the present disclosure as well.

Figure 4:
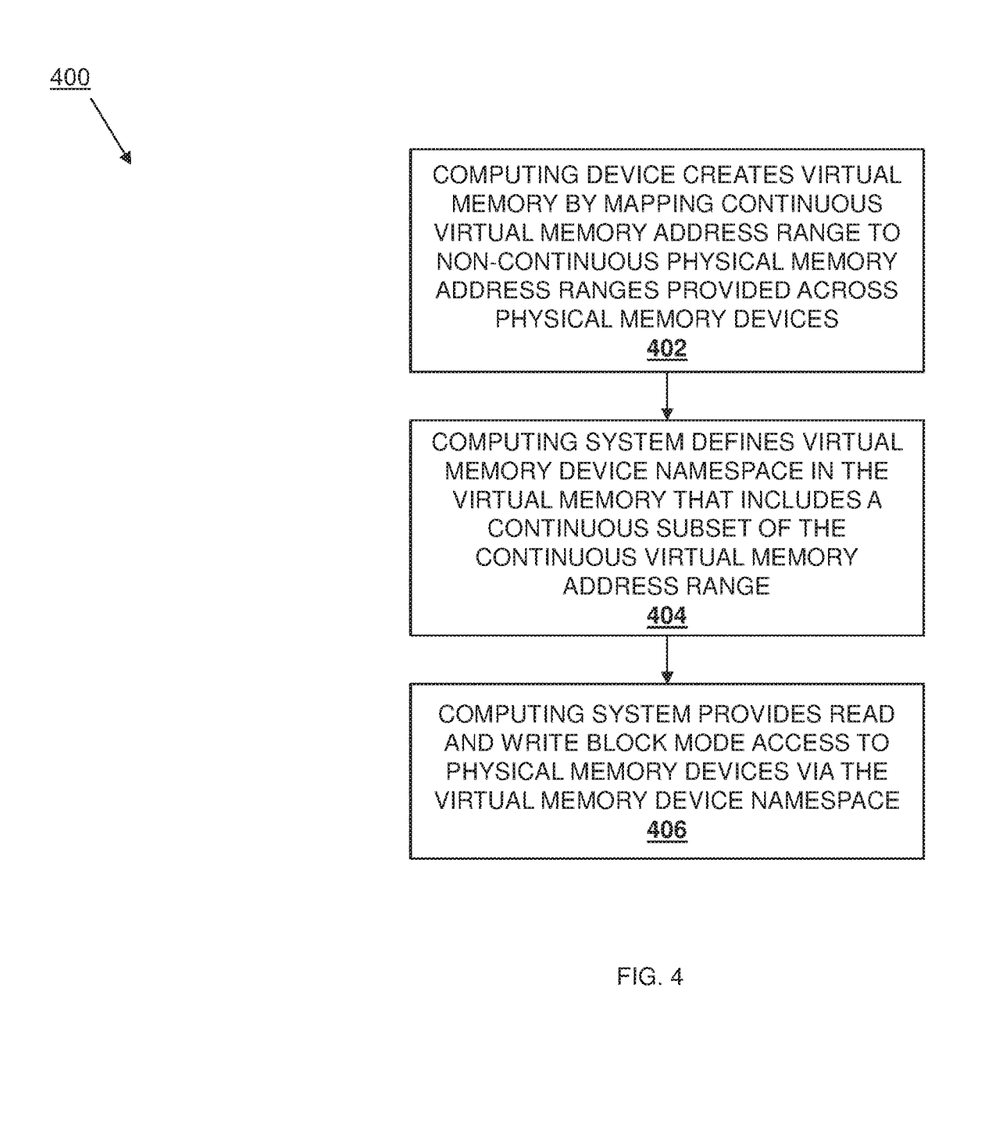
FIG. 4 is a flow chart illustrating an embodiment of a method for providing virtual memory block mode access across different physical memory devices.

Referring now to FIG. 4, an embodiment of a method 400 for providing virtual memory is illustrated. As discussed below, the systems and methods of the present disclosure provide for the mapping of respective physical memory address ranges in each of a plurality of physical memory devices to a continuous virtual memory address range in order to provide a virtual memory, and then defining any number of virtual memory namespaces as a respective continuous subset of that continuous virtual memory address range. As such, virtual memory namespaces may be provided that map to interleaved physical memory address ranges provided across different physical memory devices, while allowing block mode access to those virtual memory namespaces. Furthermore the systems and methods of the present disclosure address the dynamic removal/addition of physical memory devices in order to maintain the virtual memory and its virtual memory namespaces, and allow for adjustments of the size of the virtual memory namespaces when necessary. As such, the systems and methods of the present disclosure provide a variety of benefits over conventional virtual memory systems that can only provide block mode access to virtual memory namespaces that are provided via a continuous physical memory address range within a single physical memory device, and that cannot maintain virtual memory namespaces in response to "hot removal" (e.g., removal during runtime) of physical memory devices.

The method 400 begins at block 402 where a computing device creates virtual memory by mapping a continuous virtual memory address range to non-continuous physical memory address ranges provided across physical memory devices. In an embodiment, at block 402, the virtual memory engine 204 in the computing device 204 is configured to create the virtual memory during an initialization process for the computing device 200. For example, the virtual memory engine 204 may include a Basic Input Output System (BIOS) that, during a boot process for the computing device 200, operates to map a continuous virtual memory address range to non-continuous physical memory address ranges provided across the physical memory devices 206a-c. However, while a specific example of BIOS creating virtual memory during a boot process is described, one of skill in the art in possession of the present disclosure will recognize that other computing device subsystems may create the virtual memory at other times while remaining within the scope of the present disclosure.

Figure 5:
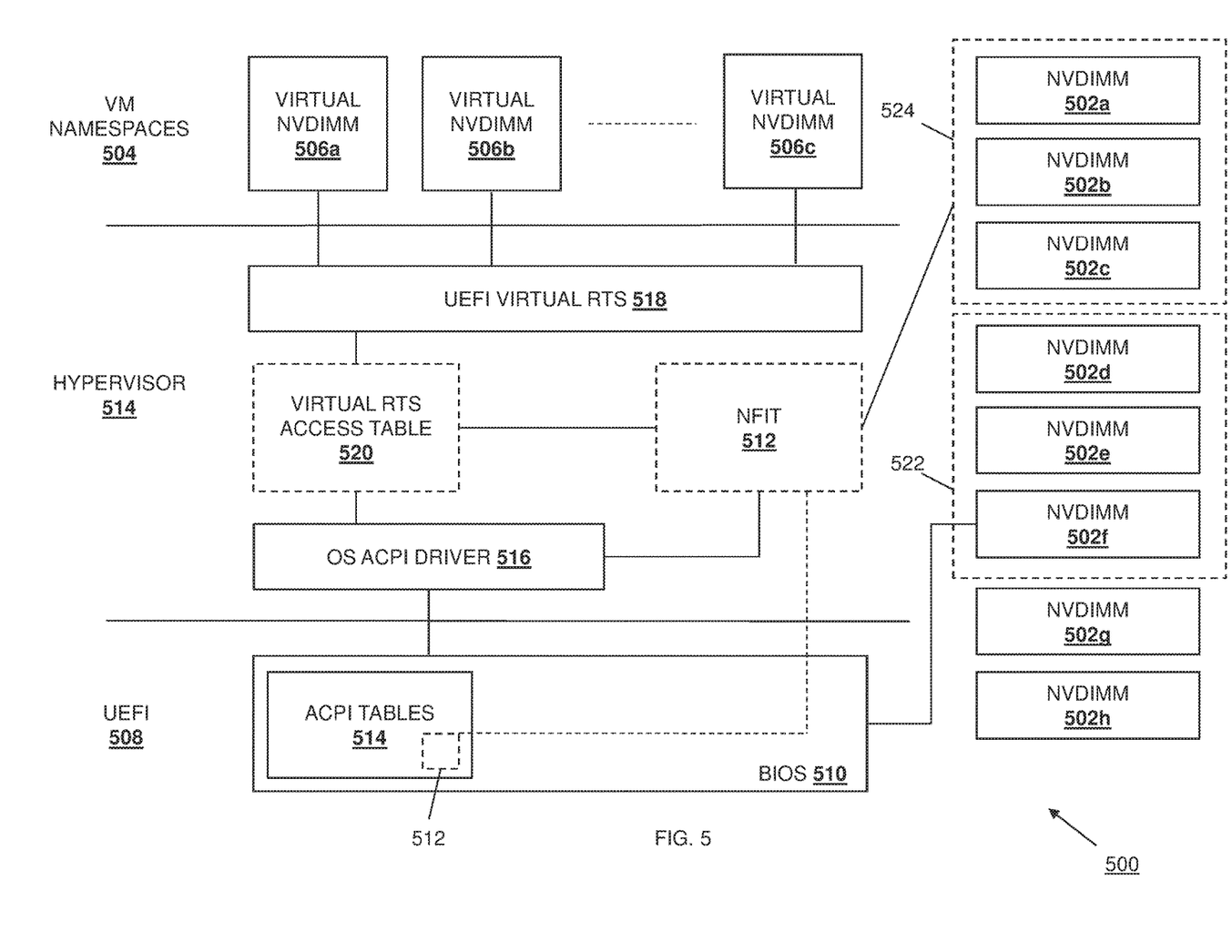
FIG. 5 is a schematic view illustrating an embodiment of the computing system of FIG. 2 providing virtual memory block mode access across different physical memory devices.

FIG. 5 illustrates a schematic view of a computing device 500 that provides a specific embodiment of the computing device 200 in which the physical memory devices 206a-c are NVDIMMs 502a-h, and virtual memory namespaces 504 in the virtual memory are provided as virtual NVDIMMs 506a-c. The computing device 500 includes a Unified Extensible Firmware Interface (UEFI) 508 that provides a BIOS 510 that may operate at block 402 during a boot process for the computing device 500 to create the virtual memory by providing a mapping in an NFIT 512 that is provided in ACPI tables 514 that are accessible to the BIOS 510.

Figure 6:
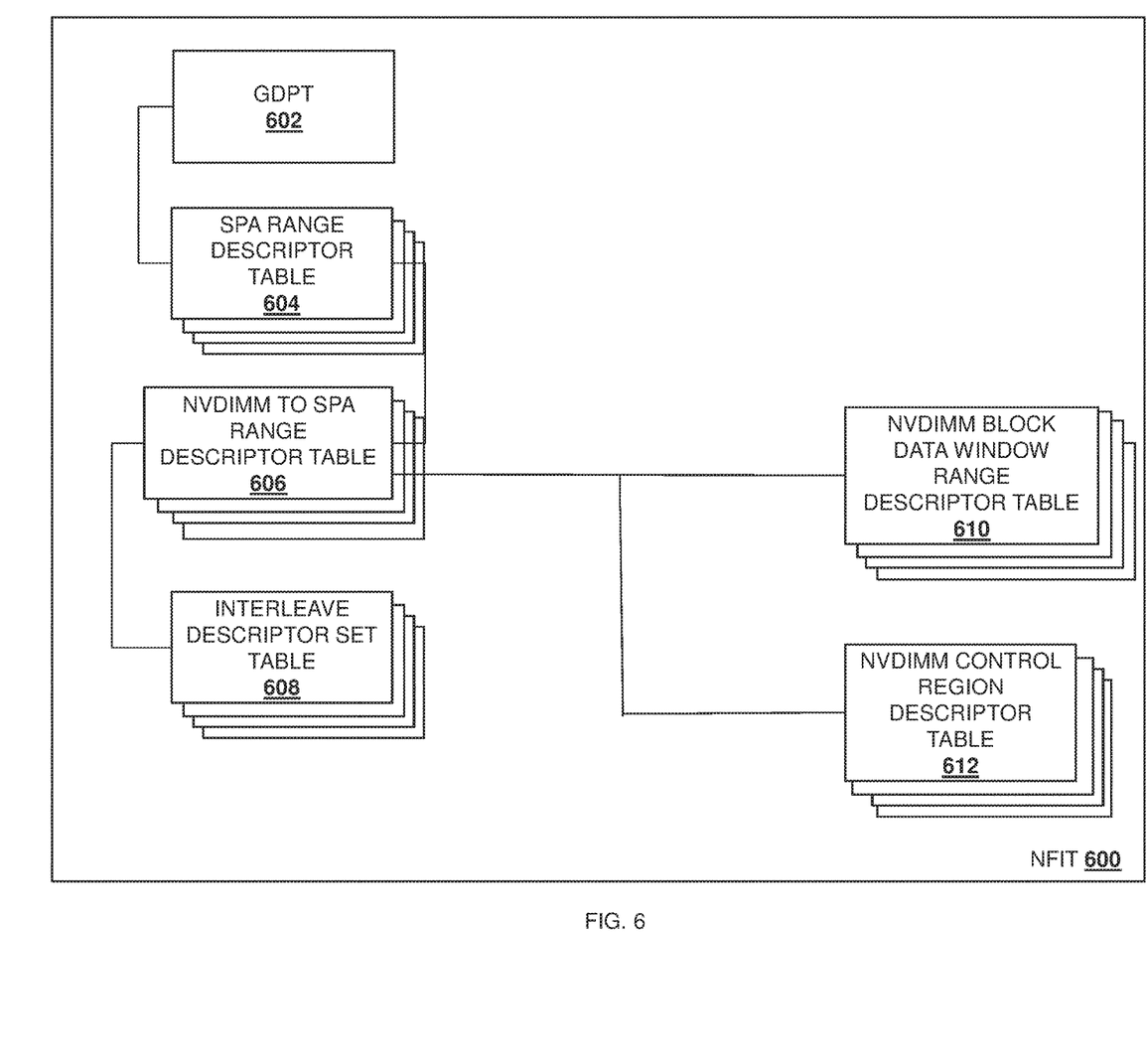
FIG. 6 is a schematic view illustrating an embodiment of an NVDIMM firmware interface table used to provide virtual memory block mode access across different physical memory devices.

FIG. 6 illustrates schematic view of an NFIT 600 that provides a specific embodiment of the NFIT 512 in which the BIOS 510 may provide the mapping to create the virtual memory at block 402 and during the boot process for the computing device 200. For example, at block 402, the BIOS 510 may associate, in a GUID Device Path Table (GDPT) 602, a first global unique identifier (GUID) and the physical memory address ranges that define the block mode persistent memory 306 in each of the physical memory devices 206a-c that are being used to provide the virtual memory for the computing device 200/500.

Figure 7:
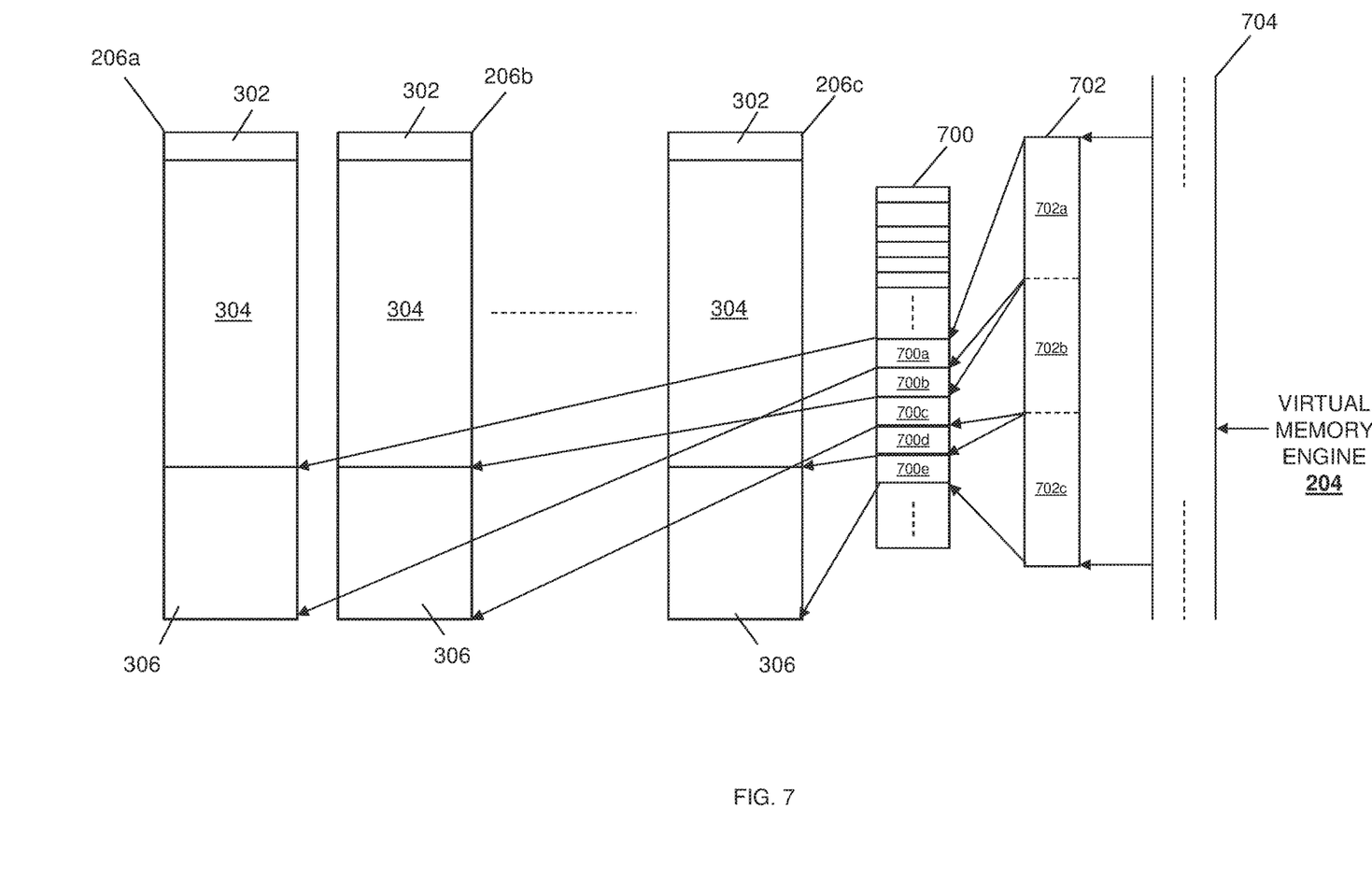
FIG. 7 is a schematic view illustrating an embodiment of the mapping of physical memory to virtual memory.

With reference to FIG. 7, a schematic view of virtual memory created at block 402 is illustrated. As can be seen in FIG. 7, the physical memory devices 206a, 206b, and 206c may have their respective block access persistent memory 306 identified (i.e., via the first GUID provided by the BIOS 510 in the GDPT 602 of the NFIT 600) to map portions of the physical memory devices 206a-c to physical memory device address ranges 700 (e.g., DIMM Physical Addresses (DPAs)) that are not continuous (e.g., they are interleaved across different physical memory devices.) For example, the block access persistent memory 306 in the physical memory device 206a is illustrated as mapped to physical memory address range 700a, the block access persistent memory 306 in the physical memory device 206b is illustrated as mapped to physical memory address range 700c, and the block access persistent memory 306 in the physical memory device 206c is illustrated as mapped to physical memory address range 700e, while physical memory address ranges 700b, and 700d are not associated with the first GUID and thus not part of the virtual memory created at block 402. FIG. 7 also illustrated a continuous virtual memory address range 702 that defines the virtual memory created at block 402, and that includes a portion 702a that is mapped to the physical memory address range 700a, a portion 702b that is mapped to the physical memory address range 700c, and a portion 702c that is mapped to the physical memory address range 700e. Finally, FIG. 7 also illustrates how system physical addresses 704 (e.g., SPAs) may be mapped to the continuous virtual memory address range 702 to allow the virtual memory engine 204 to access the virtual memory, as discussed in further detail below.

With reference back to the NFIT 600 in FIG. 6, the creation of the virtual memory at block 402 is associated with a provisioning of a variety of information in the NFIT 600. For example, the GDPT 602 in the NFIT600 is linked to System Physical Address (SPA) range descriptor table 604 that, for example, identifies the mapping of the system physical addresses 704 to the continuous virtual memory address range 702. Furthermore, the SPA range descriptor table 604 is linked to an NVDIMM-to-SPA-range descriptor table 606 that, for example, identifies the mapping of the non-continuous/interleaved physical memory device address ranges 700 to the continuous virtual memory address range 702.

As such, at block 402, a virtual memory is defined by the continuous virtual memory address range 702 that is accessible by the virtual memory engine 204 via its system physical addresses 704, and that is mapped to non-continuous physical memory address ranges 700a, 700c, and 700e that define the block access persistent memory 306 provided in the different physical memory devices 206a-c via the use of a GUID that is associated with those non-continuous physical memory address ranges 700a, 700c, and 700e in the NFIT 512/600 provided in ACPI tables 514 accessible to the BIOS 510. One of skill in the art in possession of the present disclosure will recognize that the virtual memory may be created (or re-created) during each initialization process for the computing device 200. Furthermore, if during the initialization process a physical memory device is determined to have been removed from the computing device 200 and/or a new physical memory device is determined to have been added to the computing device 200, the virtual memory engine 204 may be configured to redefine the mappings in the NFIT 512/600 to reflect the removed, added, or replaced physical memory (i.e., the physical memory address range provided in the physical memory device that was removed and/or added to the computing device 200) so that the continuous virtual memory address range 702 is not effected.

The method 400 then proceeds to block 404 where the computing device defines a virtual memory namespace in the virtual memory that includes a continuous subset of the continuous virtual memory address range. In an embodiment, at block 404, the virtual memory engine 204 in the computing device 204 is configured to define virtual memory namespaces in the virtual memory during an initialization process for the computing device 200 and/or during a runtime of the computing device. For example, the virtual memory engine 204 may include the Basic Input Output System (BIOS) that, during the boot process for the computing device 200, operates to define virtual memory namespace(s) in the virtual memory that each include a continuous subset of the continuous virtual memory address range 702. In another example, the virtual memory engine 204 may include a virtual RunTime Service (RTS) that, during a runtime of the computing device 200, operates to define virtual memory namespace(s) in the virtual memory that each include a continuous subset of the continuous virtual memory address range 702.

With reference back to FIG. 5, the schematic view of a computing device 500 includes a hypervisor 514 having an Operating System (OS) ACPI driver 516 that is configured to communicate with the BIOS 510 to access the NFIT 512, and a UEFI virtual RTS 518 that has access to a virtual RTS access table 520 that is also accessible to the OS ACPI driver 516, and that provides access to the NFIT 512 that allows the UEFI virtual RTS 518 to access any of the virtual NVDIMMs 506ac defined by the virtual memory namespaces 504. As such, during a boot process for the computing device 200 the BIOS 510 may access the NFIT 512 in order to perform block 404, and during runtime for the computing device 200 the UEFI virtual RTS 518 may access the NFIT 512 (via the virtual RTS access table and OS ACPI driver 516) in order to perform block 404.

In a specific example, at block 404, the virtual memory engine 204 may utilize a function call such as, for example, "NVDIMM_BLOCKMode_GUID (second GUID, first Namespace Identifier, NVDIMM 206a physical memory address range, NVDIMM 206b physical memory address range, ... NVDIMM 206c physical memory address range)" in order to create a virtual memory namespace that defines a virtual NVDIMM in the NFIT 512. In such a function call, the second GUID is different than the first GUID that defines the virtual memory, discussed above, and one of skill in the art in possession of the present disclosure will recognize that a different GUID may be utilized for each virtual memory namespace/virtual NVDIMM that is created at block 404. Furthermore, with reference to the example provided below, the first namespace identifier in the function call may be provided as a per-NVDIMM namespace label 302a in the device information section 302 of the NVDIMMs 206a and 206b that are used to provide its associated virtual NVDIMM namespace. Further still, the physical address memory ranges for the NVDIMMs 206a-c are provided in the function call in a manner that defines a continuous subset of the continuous virtual memory address range that is to be utilized as the virtual memory namespace/virtual NVDIMM. As such, similar function calls may be made by the virtual memory engine 204 at block 404 for each virtual memory namespace/virtual NVDIMM that is to be defined in the virtual memory.

Figure 8:
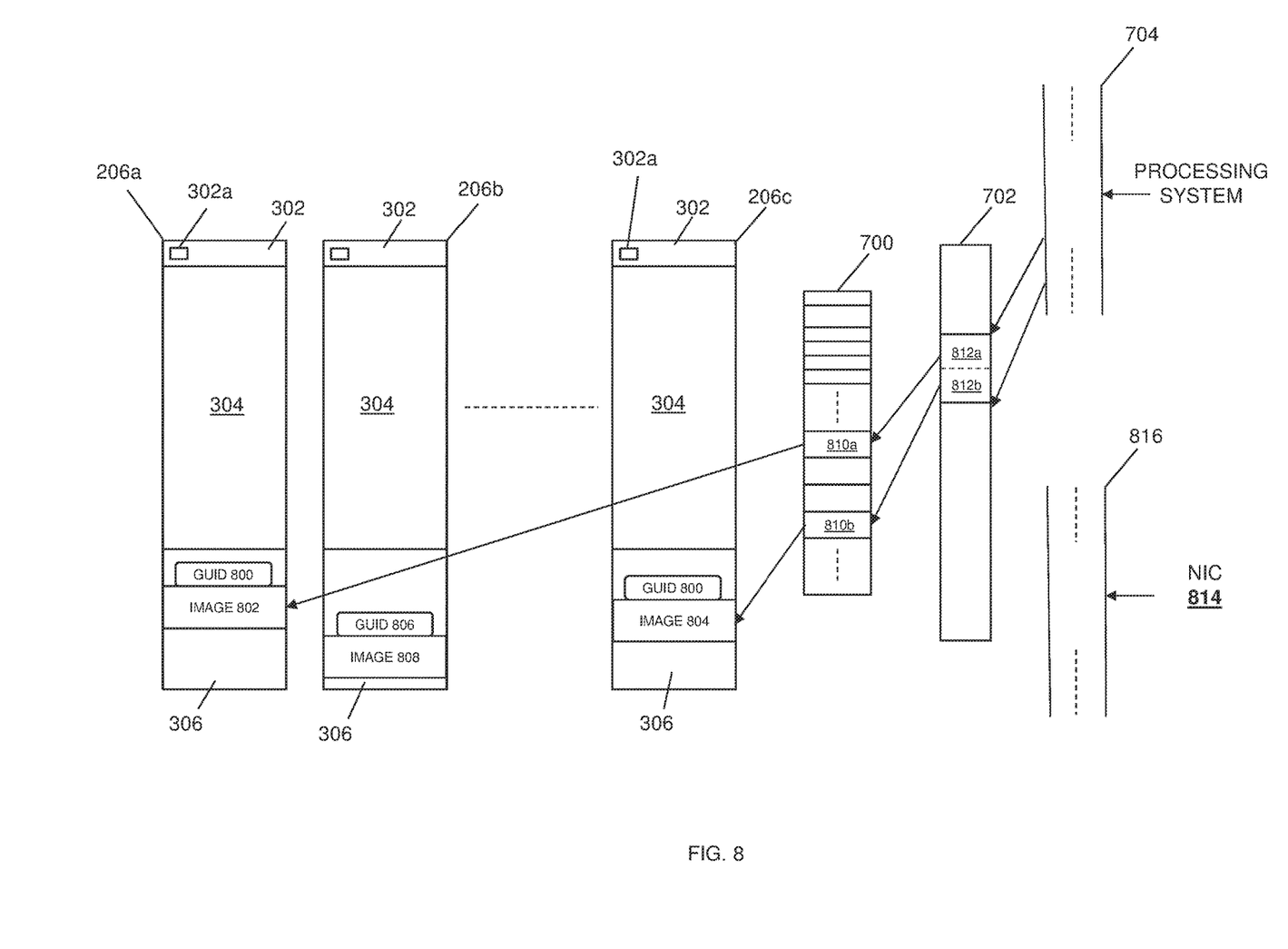
FIG. 8 is a schematic view illustrating an embodiment of the mapping of physical memory to a virtual memory namespace in the virtual memory of FIG. 7.

With reference to FIG. 8, a schematic view of a virtual memory namespace defined in virtual memory at block 404 is illustrated. As discussed above with reference to FIG. 7, virtual memory may have been defined across the physical memory devices 206a, 206b, and 206c in their block access persistent memory 306. FIG. 8 illustrates the creation of a virtual memory namespace in that virtual memory via a GUID 800 associated with image data 802 in a portion of the block access persistent memory 306 in the physical memory device 206a, the GUID 800 associated with image data 804 in a portion of the block access persistent memory 306 in the physical memory device 206c, and the namespace label 302a in the device information section 302 of the physical memory devices 206a and 206b. As discussed above, the portion of the block access persistent memory 306 in the physical memory device 206a that stores the image data 802 may be mapped to a subset 810a of the physical memory address ranges 700, and the portion of the block access persistent memory 306 in the physical memory device 206c that stores the image data 804 may be mapped to a subset 810b of the physical memory address ranges 700, as illustrated in FIG. 8. Furthermore, FIG. 8 also illustrates how a continuous subset of the continuous virtual memory address range 702 defines the virtual memory namespace in the virtual memory, with a first continuous portion 812a of the continuous virtual memory address range 702 mapped to the subset 810a of the physical memory address ranges 700, and a second continuous portion 812b (that is continuous with the first continuous portion 812a) of the continuous virtual memory address range 702 mapped to the subset 810b of the physical memory address ranges 700. Finally, FIG. 8 illustrates how a processing system (e.g., that provides the virtual memory engine 204) may utilize the system physical addresses 704 mapped to the continuous virtual memory address range 702 to access the virtual memory, and one of skill in the art in possession of the present disclosure will recognize that a Network Interface Controller (NIC) may access the virtual memory in a similar manner via Direct Memory Range (DMR) addresses 816.

With reference back to the NFIT 600 in FIG. 6, the defining of a virtual memory namespace in the virtual memory at block 404 is associated with a provisioning of a variety of information in the NFIT 600. For example, the NVDIMM-to-SPA-range descriptor table 606 is linked to an interleave descriptor set table 608 that may include, for example, information on the size and offsets of the physical memory address ranges that define a virtual memory namespace and that allow for reading across portions of different physical memory devices that provide the virtual NVDIMM. The NVDIMM-to-SPA-range descriptor table 606 is also linked to an NVDIMM block data window range descriptor table 610 that includes, for example, information that allows the virtual memory engine 204 to view the non-continuous physical memory address ranges that provide the virtual NVDIMM as the continuous virtual memory address range, and information that provides for the translation of commands directed to the virtual memory address range to commands directed to the physical NVDIMMs. The NVDIMM-to-SPA-range descriptor table 606 is also linked to an NVDIMM control region descriptor table 612 that includes information identifying the command registers and status registers in the physical memory devices to provide for the consistent block access to those physical memory devices via the continuous virtual memory address range by pointing to individual interleaved physical memory device address ranges across different physical memory devices.

The method 400 then proceeds to block 406 where the computing device provides read and write block mode access to the physical memory devices via the virtual memory namespace. In an embodiment, at block 406, the virtual memory engine 204 operates to provide read and write block mode access to the physical memory devices 206a-c via the virtual memory namespace that is defined in the continuous virtual memory address range 702. For example, with reference to FIG. 5, at block 406 and during runtime of the computing device 200/500, a virtual machine or operating system in the computing device 200 may call the UEFI virtual RTS 518 with instructions to read or write to the virtual NVDIMMs 506a-c via the continuous virtual memory address range 702, and the UEFI virtual RTS 518 may access the NFIT 512 (via the virtual RTS access table 520 and OS ACPI driver 516) and utilize the information provided in the NFIT 512/600 discussed above with reference to FIG. 6 to convert those instructions so that the read or write may be made to the non-continuous physical memory device address ranges provided in the NVDIMMs 502*a*-*h*. FIG. 5 illustrates how a first virtual memory namespace may be defined across the NVDIMMs 502*a*-*c*, and a second virtual memory namespace may be defined across the NVDIMMs 502*d*-*f*, and at block 406 the UEFI virtual RTS 518 may receive a read or write instruction directed to a first subset of the continuous virtual memory address range 702 that defines the virtual NVDIMM 506*a*. In response, the UEFI virtual RTS 518 may access the NFIT 512 through the virtual RTS access table 520 to convert the read or write instructions so that the read or write may be performed on the non-continuous physical memory address ranges provided across the NVDIMMs 502*a*-*c* that correspond to the virtual NVDIMM 506*a*. In addition, during runtime of the computing device 200, the UEFI virtual RTS 518 may securely update the NFIT 512 via the OS ACPI driver 516 to address changes in the physical memory system 206 or the virtual memory, and maintain the NFIT 512 to provide the virtual machine or operating system fast access to the virtual memory.

In some embodiments, one or more of the physical memory devices 206*a*-*c* in the computing device 200 may be replaced. For example, a first physical memory device that includes a physical memory device address range that provides a portion of a virtual memory namespace in the virtual memory may be replaced with a second physical memory device. In response to detecting such a replacement (e.g., upon initialization of the computing device 200), the virtual memory engine 204 may access the NFIT 512, identify the information that defines the portion of the virtual memory namespace that was provided by the physical memory device address range in the first physical memory device, and modify that information with a physical memory address range in the second physical memory device (which may be preceded by the creation of a portion of the virtual memory via the first GUID to define the block access persistent memory on that second physical memory device) such that the virtual memory address namespace is not effected by the replacement of the first physical memory device. As such, subsequent read and write instructions to the virtual memory namespace associated with the replaced physical memory device will be converted (e.g., by the UEFI virtual RTS 518 via the NFIT 512) so that information may be read from or written to the second physical memory device.

In some embodiments, the computing device 200 may increase the size of a virtual memory and/or namespace. For example, a determination may be made during runtime that the size of the virtual memory should be increased in response to, for example, an instruction from a user, a determination that the available space in the virtual memory is below a predetermined amount, and/or in response to a variety of factors that would be apparent to one of skill in the art in possession of the present disclosure. If such a determination is made, during a subsequent initialization process for the computing device 200, the BIOS included in the virtual memory engine 204 may operate to modify the information in the NFIT in order to expand the size of the virtual memory by allocated additional physical memory device address ranges in the physical memory devices to the virtual memory using, for example, the first GUID discussed above, and providing for the mapping of those additional physical memory device address ranges via an additional continuous virtual memory address range that is continuous with the previously existing continuous virtual memory address range.

Similarly, if a determination is made during runtime that the size of a virtual memory namespace should be increased (e.g., in response to an instruction from a user, a determination that the size of the virtual memory has almost been used up, and/or a variety of factors that would be apparent to one of skill in the art in possession of the present disclosure), the UEFI virtual RTS included in the virtual memory engine 204 may operate to modify the information in the NFIT in order to expand the size of that virtual memory namespace by allocated additional physical memory device address ranges in the physical memory devices to the virtual memory using, for example, the second GUID discussed above, and redefining that virtual memory namespace via the continuous virtual memory address range 702 by providing a second subset of the continuous virtual memory address range that is continuous with the first subset of the continuous virtual memory address range that previously defined that virtual memory namespace prior to expanding its size.

Thus, systems and methods have been described that provide for the mapping of respective physical NVDIMM address ranges in each of a plurality of physical NVDIMMs to a continuous virtual memory address range in order to provide a virtual memory, along with the defining of any number of virtual NVDIMMs as respective continuous subsets of that continuous virtual memory address range. As such, virtual NVDIMMs may be provided that map to interleaved physical NVDIMM address ranges provided across different physical NVDIMMs, while allowing block mode access to those virtual NVDIMMs. Furthermore the systems and methods of the present disclosure address the dynamic removal/addition of physical NVDIMMs in order to maintain the virtual memory and its virtual NVDIMMs, and allow for adjustments of the size of the virtual NVDIMMs when necessary. As such, the systems and methods of the present disclosure provide a variety of benefits over conventional virtual memory systems that can only provide block mode access to virtual NVDIMMs that are provided via a continuous physical NVDIMM address range within a single physical NVDIMM, and that cannot maintain virtual NVDIMMs in response to "hot removal" (e.g., removal during runtime) of physical NVDIMMs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A virtual memory system, comprising:
   a plurality of physical memory devices;
   a virtual memory database; and
   a virtual memory engine that is coupled to each of the plurality of physical memory devices and the virtual memory database, and that includes a Basic Input Output System (BIOS) and a runtime service, wherein the virtual memory engine is configured to:
   create, during an initialization process and in the virtual memory database using a first global unique identifier, virtual memory by mapping a continuous virtual memory address range to interleaved physical memory device address ranges that are provided across the plurality of physical memory devices;

define, in the virtual memory database using a second global unique identifier, a virtual memory device namespace in the virtual memory that includes a first continuous subset of the continuous virtual member address range, wherein the BIOS is configured to define the virtual memory namespace identifier during the initialization process and in the virtual memory database using the second global unique identifier, and wherein the runtime service is configured to define the virtual memory namespace subsequent to the initialization process and during runtime in the virtual memory database using the second global unique identifier; and provide, during runtime, read and write block mode access to the plurality of physical memory devices via the virtual memory device namespace defined in the virtual memory database.

2. The virtual memory system of claim 1, wherein the plurality of virtual memory devices are Non-Volatile Virtual Memory Modules (NVDIMMs) and the virtual memory is a virtual NVDIMM.

3. The virtual memory system of claim 2, wherein the virtual memory database includes an NVDIMM Firmware Interface Table (NFIT).

4. The virtual memory system of claim 1, wherein the virtual memory engine is configured to:

determine that a first physical memory device of the plurality of physical memory devices has been replaced with a second physical memory device; and replace, in the virtual memory database and in response to determining that the first physical memory device has been replaced with the second physical memory device, a first physical memory device address range that is provided in the first physical memory device, included in interleaved physical memory device address ranges, and mapped to the continuous virtual memory address range, with a second physical memory device address range provided in the second physical memory device.

5. The virtual memory system of claim 4, wherein the virtual memory engine is configured to:

provide, during runtime and as a result of replacing the first physical memory address range with second physical memory address range, read and write block mode access to the second physical memory device via the virtual memory namespace.

6. The virtual memory system of claim 1, wherein the virtual memory engine is configured to:

increase the size of the virtual memory device namespace in the virtual memory by redefining, in the virtual memory database using the second global unique identifier, the virtual memory device namespace to include the first continuous subset of the continuous virtual memory address range and a second continuous subset of the continuous virtual memory address range that is continuous with the first continuous subset.

7. An information handling system (IHS), comprising:

a processing system; and a memory system that is coupled to the processing system and that includes instructions that, when executed by the processing system, cause the processing system to provide a virtual memory engine that includes a Basic Input/Output System (BIOS) and a runtime service and that is configured to:

create, during an initialization process and in a virtual memory database using a first global unique identifier, virtual memory by mapping a continuous virtual memory address range to interleaved physical memory device address ranges that are provided across a plurality of physical memory devices;

define, in the virtual memory database using a second global unique identifier, a virtual memory device namespace in the virtual memory that includes a first continuous subset of the continuous virtual member address range, wherein the BIOS is configured to define the virtual memory namespace identifier during the initialization process and in the virtual memory database using the second global unique identifier, and wherein the runtime service is configured to define the virtual memory namespace subsequent to the initialization process and during runtime in the virtual memory database using the second global unique identifier; and provide, during runtime, read and write block mode access to the plurality of physical memory devices via the virtual memory device namespace defined in the virtual memory database.

8. The IHS of claim 7, wherein the plurality of virtual memory devices are Non-Volatile Virtual Memory Modules (NVDIMMs) and the virtual memory is a virtual NVDIMM.

9. The IHS of claim 8, wherein the virtual memory database includes an NVDIMM Firmware Interface Table (NFIT).

10. The IHS of claim 7, wherein the virtual memory engine is configured to:

determine that a first physical memory device of the plurality of physical memory devices has been replaced with a second physical memory device;

replace, in the virtual memory database and in response to determining that the first physical memory device has been replaced with the second physical memory device, a first physical memory device address range that is provided in the first physical memory device, included in the interleaved physical memory device address ranges, and mapped to the continuous virtual memory address range, with a second physical memory device address range provided in the second physical memory device; and provide, during runtime and as a result of replacing the first physical memory address range with second physical memory address range, read and write block mode access to the second physical memory device via the virtual memory namespace.

11. The IHS of claim 7, wherein the virtual memory engine is configured to:

increase the size of the virtual memory device namespace in the virtual memory by redefining, in the virtual memory database using the second global unique identifier, the virtual memory device namespace to include the first continuous subset of the continuous virtual memory address range and a second continuous subset of the continuous virtual memory address range that is continuous with the first continuous subset.

12. A method for providing virtual memory, comprising:

creating, by a computing device during an initialization process and in a virtual memory database using a first global unique identifier, virtual memory by mapping a continuous virtual memory address range to interleaved physical memory device address ranges that are provided across a plurality of physical memory devices;

defining, by the computing device in the virtual memory database using a second global unique identifier, a virtual memory device namespace in the virtual memory that includes a first continuous subset of the continuous virtual member address range, wherein the defining includes:

defining, by a Basic Input/Output System (BIOS) in the computing device during the initialization process, the virtual memory namespace in the virtual memory database using the second global unique identifier; and defining, by a runtime service in the computing device subsequent to the initialization process and during runtime, the virtual memory namespace in the virtual memory database using the second global unique identifier; and providing, by the computing device during runtime, read and write block mode access to the plurality of physical memory devices via the virtual memory device namespace defined in the virtual memory database.

13. The method of claim 12, wherein the plurality of virtual memory devices are Non-Volatile Virtual Memory Modules (NVDIMMs) and the virtual memory is a virtual NVDIMM.

14. The method of claim 13, wherein the virtual memory database includes an NVDIMM Firmware Interface Table (NFIT).

15. The method of claim 12, further comprising:
determining, by the computing device, that a first physical memory device of the plurality of physical memory devices has been replaced with a second physical memory device; and
replacing, by the computing device in the virtual memory database and in response to determining that the first physical memory device has been replaced with the second physical memory device, a first physical memory device address range that is provided in the first physical memory device, included in the interleaved physical memory device address ranges, and mapped to the continuous virtual memory address range, with a second physical memory device address range provided in the second physical memory device.

16. The method of claim 15, further comprising:
providing, by the computing device during runtime and as a result of replacing the first physical memory address range with second physical memory address range, read and write block mode access to the second physical memory device via the virtual memory namespace.

17. The method of claim 12, further comprising:
increasing, by the computing device, the size of the virtual memory device namespace in the virtual memory by redefining, in the virtual memory database using the second global unique identifier, the virtual memory device namespace to include the first continuous subset of the continuous virtual memory address range and a second continuous subset of the continuous virtual memory address range that is continuous with the first continuous subset.

* * * * *